United States Patent

Unkelbach et al.

Patent Number: 6,095,441
Date of Patent: Aug. 1, 2000

[54] PROCESS OF SEPARATING MIXED PLASTIC WASTE INTO LIGHT AND HEAVY PLASTIC PHASES

[75] Inventors: Karl-Heinz Unkelbach, Köln; Jochen Neureither, Heidelberg, both of Germany

[73] Assignee: Baker Hughes (Deutschland) GmbH, Cologne, Germany

[21] Appl. No.: 09/073,454

[22] Filed: May 6, 1998

[30] Foreign Application Priority Data

May 9, 1997 [DE] Germany .............. 197 19 734

[51] Int. Cl.[7] .................................................. B02C 19/12
[52] U.S. Cl. ................ 241/20; 241/24.14; 241/24.18
[58] Field of Search .................. 241/20, 29, 21, 241/24.17, 24.18, DIG. 38, 24.14

[56] References Cited

U.S. PATENT DOCUMENTS

| | | | |
|---|---|---|---|
| 5,598,980 | 2/1997 | Dilly-Louis et al. | 241/24.18 |
| 5,722,603 | 3/1998 | Costello et al. | 241/24.18 |

FOREIGN PATENT DOCUMENTS

| | | |
|---|---|---|
| 25 39 960 | 3/1976 | Germany . |
| 35 12 965 | 10/1985 | Germany . |
| 29 00 666 | 4/1992 | Germany . |
| 41 30 645 | 3/1993 | Germany . |
| 42 08 104 A1 | 8/1993 | Germany . |
| 41 06 812 | 11/1993 | Germany . |
| 43 06 781 | 9/1994 | Germany . |
| 43 38 864 | 8/1995 | Germany . |
| 195 16 636 | 2/1996 | Germany . |

OTHER PUBLICATIONS

"Kunststoffsortierung im Zentrifugalfeld" by Otte–Witte, Rolf.

Primary Examiner—Mark Rosenbaum
Attorney, Agent, or Firm—R. Neil Sudol; Henry D. Coleman

[57] ABSTRACT

According to the present invention, plastic waste mixture is first comminuted, and if required, subjected to magnetic separation and/or eddy-current separation, by which separable metals are removed. The comminuted plastic waste mixture is then mixed with a separation liquid in a mixing tank which has an outlet for heavy phase impurities. This suspension is directed to a hydrocyclone for a first separation procedure. The hydrocyclone is optimally adjusted in such a manner that any remaining unwanted heavy phase impurities together with the heavy phase undesirable plastics, such as the PVC fraction of the plastic waste mixture, is separated from the balance of the plastic waste materials as hydrocyclone underflow. The heavy underflow of the mixing tank and the hydrocyclone underflow may be further reprocessed separately or jointly. The hydrocyclone overflow now directly reaches a sorting centrifuge in which the remaining plastic waste mixture is subjected to further separation under the effect of centrifugal forces. The products discharged from that separating operation include a heavier phase plastic which can be well utilized for feedstock recycling, e.g. in a blast furnace and a fraction of light plastic waste (PO) which can be utilized for material recycling.

3 Claims, 1 Drawing Sheet

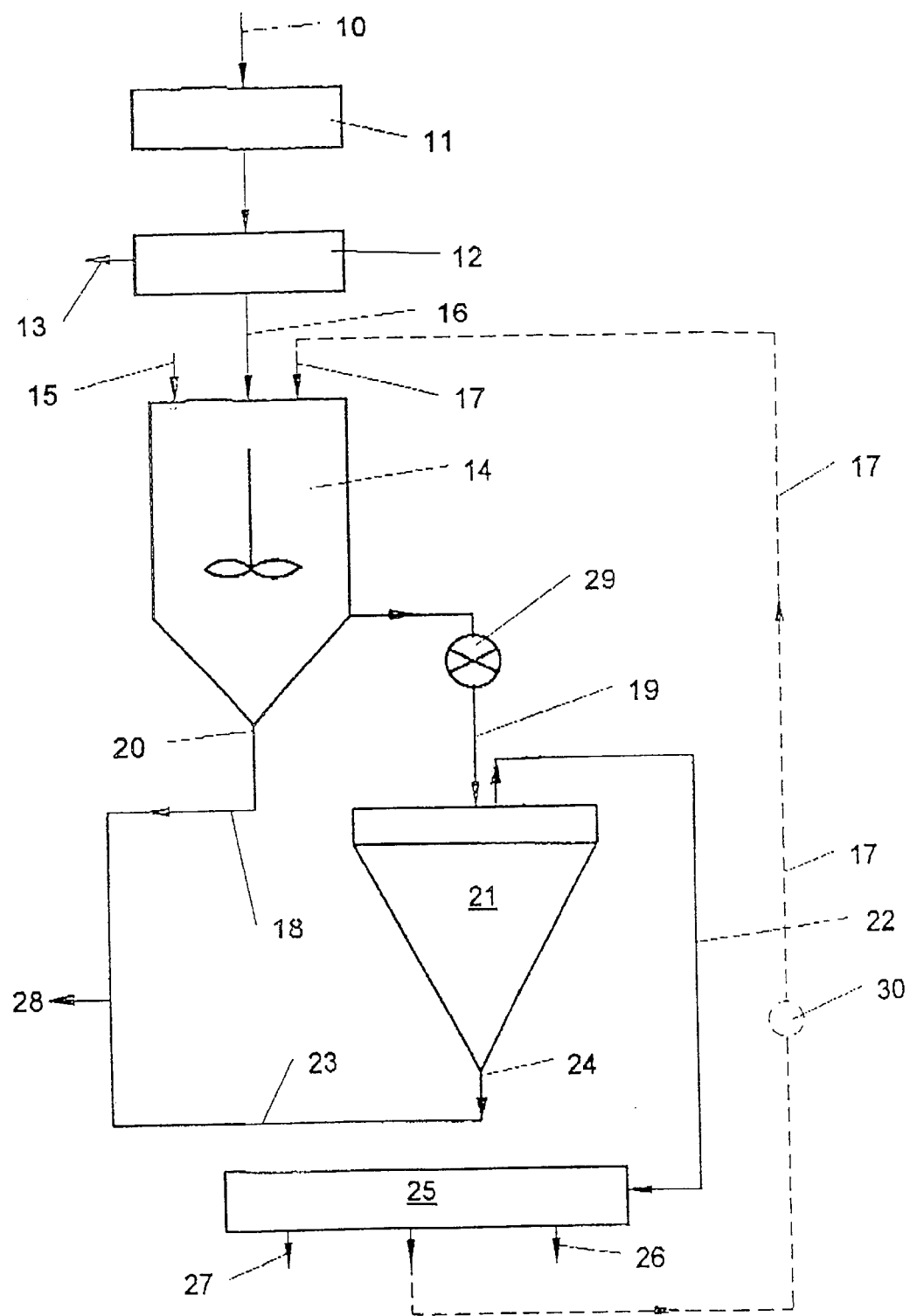

PROCESS OF SEPARATING MIXED PLASTIC WASTE INTO LIGHT AND HEAVY PLASTIC PHASES

BACKGROUND OF THE INVENTION

The invention covers a process for the wet-mechanical separation of solids of varying density from solids mixtures, such as mixtures of household and industrial waste including plastics (PVC, PO, PS, PA, PET, PE, PP) which have been contaminated with heavy mineral solids such as sands, and/or with other heavy solids, such as metals, preferably for the separation of mixed plastic waste.

Pursuant to current environmental laws and regulations of many countries, plastic waste mixtures from household or industrial disposable product and packaging waste shall be 80% recycled. As to recycling of waste as a feedstock, this can be done by incineration, e.g., in a blast furnace, or as to material recycling in the manufacture (or remanufacture) of commodity goods. Heretofore, the easiest way to separate the waste mixture has been to do so manually into different fractions which are directed to varying use. The bottle and the plastic sheeting fraction are predominantly made up of HDPE and/or LDPE which after cleaning can be well utilized for material recycling.

The procedure of separation for different plastic phase or fractions is more difficult for mixed plastic waste because in addition to a multitude of different plastic types also composite materials and varying foreign matter exist as impurities in that waste. No more than approximately half of the waste can be removed as light plastic phase primarily made up of PE and PP—via separation by density and afterwards be used for material recycling. Therefore, it is general practice today to have the mixed plastic waste exclusively used for feedstock recycling after separation of approximately 10% of impurities (metals, etc.). These impurities are normally removed by simple mechanical processes, such as air classification, screening, magnetic separation, etc.

In view of the fact, however, that material recycling is the less polluting recycling method, efforts should be made to recover an as large portion of the light plastic phase as possible from the mixed plastic waste for material recycling. Consequently, two separation procedures have to be carried out to reach that objective, i.e., separation of the light plastic (for material recycling) and separation of impurities from the remaining heavy plastic phase (for feedstock recycling). However, the methods used so far make that process very complicated and, consequently, uneconomical.

SUMMARY OF THE INVENTION

The object of the process of this invention is to establish a method that enables a simple and economic separation of plastic waste mixtures of the type described above with the objective to separate an as high percentage of material recyclable plastic as possible with the remaining plastic waste phase being at least usable for feedstock recycling.

The problem is solved by the process of this invention by comminuting the plastic waste, followed by subsequent magnetic separation of metal impurities, the plastic waste mixture being converted into a suspension after having been mixed with a separation liquid in a mixing tank, directing the suspension to a hydrocyclone and then to a sorting centrifuge to be separated by density in fractions of different density by the effect of centrifugal forces.

The installation of a sorting centrifuge downstream of a hydrocyclone for the separation of plastic waste mixtures has been described earlier in DE-196 06 415.5 which has not been published. However, this prior art process described there is used solely for the separation of unwanted impurities from plastic waste mixtures, e.g., impurities from a plastic sheeting waste or from a fraction of plastic bottle waste, According to the process of this invention, mechanical separation can now be effected for mechanical and continuous separating of mixed plastic waste into heavy and light plastic phases for feedstock and material recycling, respectively.

According to the present invention the plastic waste mixture is first comminuted, preferably to less than 20 mm. Size reduction is normally a one-stage procedure but may also include several stages depending on material sizes and types. If required, this operation is followed by magnetic separation and/or eddy-current separation—in case of several stage comminution also between the different size-reducing stages—by which separable metals are removed. The comminuted plastic waste mixture is then mixed with a separation liquid in a mixing tank which has been provided with a bottom outlet for the heavy phase impurities. This means that impurities, if any, (such as sands, metals, etc.) are separated from the suspension through the mixing tank outlet.

The suspension thus produced is directed from the mixing tank to a hydrocyclone for a first separation procedure under the effect of centrifugal forces. The hydrocyclone which is preferably a flat-bottom cyclone has been optimally adjusted in such a manner that apart from any remaining unwanted heavy phase impurities together with the heavy phase undesirable plastics, such as the PVC fraction of the plastic waste mixture, is separated from the balance of plastic waste materials as hydrocyclone underflow.

The heavy products from the underflow of the mixing tank and from the hydrocyclone underflow may be further reprocessed separately or jointly. For example, pure metal products can be very well recovered from that product by magnetic separation and/or eddy-current separation (small volume flow free of sheeting). The remaining quantity will be disposed of. Similar to conventional separation, it amounts to approximately 10% to 15%—relative to the initial quantity.

The hydrocyclone overflow now directly reaches a sorting centrifuge in which the remaining plastic waste mixture is subjected to further separation under the effect of centrifugal forces. The products discharged from that separating operation include a plastic waste fraction free of PVC made up of heavier phase plastic which can be well utilized for feedstock recycling, e.g. in a blast furnace as reducing gas generating agent. The quantity amounts to approximately 35 to 40% of the total plastic waste being treated.

Moreover, a fraction of light plastic waste (PO) is also obtained which can be utilized at higher added value for material recycling. The quantity available amounts to approximately 40 to 55% of the total. The percentages specified exist for a typical plastic waste mixture. The values may differ in case of heavily contaminated plastic wastes.

The process of this invention outlines an opportunity to have quite a significant portion of a waste product recovered for material recycling which at present is utilized exclusively for feedstock recycling. Apart from that, the portion well usable for feedstock recycling is free of PVC. The process applied is of simple structure and can be run cost-efficiently. In particular, significant energy cost can be saved by the use of a sorting centrifuge because the products discharged from the centrifuge have already been mechanically dewatered which means that almost dry reprocessing results characterized by a minimum demand of separating liquid.

BRIEF DESCRIPTION OF THE DRAWINGS

The drawing is flow sheet showing the flow of mixed plastic waste through a typical plant

DETAILED DESCRIPTION OF THE INVENTION

The plastic waste mixture 10 chosen for separation (mixed plastic waste fraction) is fed into a size-reducing (or pulverizing) equipment 11 in which the feed material is comminuted to a size of minus 20 mm in one or several comminution stages. Subsequently, magnetically removable metals 13 are separated from the plastic waste mixture in a magnetic or eddy current separator 12.

The remaining plastic waste mixture 16 which is substantially free of metals is now fed into a mixing tank 14 in which the plastic waste particles are mixed to a suspension with the separation liquid via a source 15, via recycle 17 by intense stirring. The suspension is routed over pipelines by a feed pump 29 through an outlet at the side to a hydrocyclone 21. The heavy impurities 18 released during stirring, e.g. previously adhering dirt or dissolved composite materials as well as metal particles which remained after magnetic or eddy current separation, can be withdrawn over an outlet opening 20 in the bottom of the mixing tank.

The hydrocyclone 21 in which a separation by density is carried out under the effect of centrifugal forces is preferable a flat-bottom hydrocyclone which has been optimally set in such a manner that the PVC included in the plastic waster mixture is discharged jointly with the remaining heavy phase impurities, such as metals, sands, etc. as hydrocyclone underflow 23. The hydrocyclone underflow 23 as well as the heavy impurities 18 which are removed at the bottom of the mixing tank are united and directed to further sorting as mixture 28.

The remaining plastic waste mixture which has been freed of PVC and impurities is discharged as hydrocyclone overflow suspension 22 and fed into a sorting centrifuge 25. This is where further separation takes place under the effect of centrifugal forces with fraction 27 including the light phase plastics (PO) and fraction 26 which contains the residual heavy phase plastics are discharged separately.

The separation liquid 17 which is discharged separately from the sorting centrifuge 25 because the centrifuge provides from simultaneous dewatering, is recycled to the mixing tank 14 over a pipeline or overflow by means of a pump 30.

Recirculation of the separation liquid means that only small amounts of the separation liquid are lost due to the fact that separation liquid adheres to the obtained products 18, 23, 16, 17. That loss is made good for by the addition of fresh separation liquid 15 to the mixing tank 14.

What is claimed is:

1. A process for the wet-mechanical separation of solids of varying densities from a plastic waste mixture, which have been contaminated by heavy mineral impurities, into a contaminate-free light plastic phase for material recycle and a heavy plastic phase for feedstock recycle, the process comprising:

a) comminuting the plastic waste mixture;

b) mixing of the comminuted plastic waste mixture with a separation liquid and separating and discharging heavy phase impurities from the plastic mixture in a separation vessel;

c) separating any remaining heavy impurities and PVC from the mixture in a hydrocyclone as hydrocyclone underflow; and d) separating the remaining plastic waste mixture contained in the hydrocylone overflow in a sorting centrifuge into a light phase for material recycle and a heavy plastic phase free of PVC for feedstock recycle.

2. The process of claim 1 further comprising magnetic separation of metallic impurities from the comminuted plastic waste mixture.

3. The process of claim 1 further comprising eddy-current separation of the impurities from the comminuted plastic waste mixture.

* * * * *